(12) United States Patent
Schmied et al.

(10) Patent No.: US 8,714,630 B2
(45) Date of Patent: May 6, 2014

(54) FLAT VEHICLE BODY COMPONENT MADE OF A CARBON FIBER REINFORCED PLASTIC

(75) Inventors: Philipp Schmied, Munich (DE);
Carsten Mueller, Seeshaupt (DE);
Rastislav Takacs, Munich (DE);
Thomas Schnaufer, Wessobrunn (DE);
Siegfried Stoeckl, Pfeffenhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 33 days.

(21) Appl. No.: 13/460,078

(22) Filed: Apr. 30, 2012

(65) Prior Publication Data
US 2012/0248821 A1   Oct. 4, 2012

Related U.S. Application Data

(63) Continuation of application No. PCT/EP2010/066066, filed on Oct. 25, 2010.

(30) Foreign Application Priority Data

Oct. 28, 2009   (DE) .......................... 10 2009 050 990

(51) Int. Cl.
F16B 2/24        (2006.01)
F16B 5/06        (2006.01)
B62D 29/04       (2006.01)
F16B 5/10        (2006.01)
F16B 12/20       (2006.01)

(52) U.S. Cl.
USPC .............. 296/191; 24/295; 24/458; 52/716.7; 296/1.08; 296/29; 296/181.2; 296/901.01

(58) Field of Classification Search
USPC ........... 24/289, 291, 292, 293, 294, 295, 458, 24/581.11; 52/716.5, 716.6, 716.7, 716.8, 52/718.03, 718.04, 718.05; 293/1.08, 293/39.1, 191; 428/31; 296/1.08, 39.1, 191, 296/29, 181.2, 900, 901.01
See application file for complete search history.

(56) References Cited

U.S. PATENT DOCUMENTS 2,311,410 A * 2/1943 Meyer .......................... 52/716.6
2,358,206 A * 9/1944 Boersma ...................... 52/716.5

(Continued)

FOREIGN PATENT DOCUMENTS

DE        30 25 660 C2     8/1983
DE        3715493 A1 * 12/1988 .............. B60R 11/00

(Continued)

OTHER PUBLICATIONS

International Search Report dated Feb. 4, 2011 with English translation (six (6) pages).

(Continued)

Primary Examiner — Glenn Dayoan
Assistant Examiner — Paul Chenevert
(74) Attorney, Agent, or Firm — Crowell & Moring LLP

(57) ABSTRACT

A flat vehicle body component made of a carbon fiber reinforced plastic has at least one interconnecting web that protrudes from the flat vehicle body component and that is made entirely of the matrix material epoxy resin. A mounting part at least partially envelops the interconnecting web in a force locking manner, so that the mounting part is clamped securely on the interconnecting web. The mounting part has at least one hole that can be used for fastening another component. An additional component may be fastened in the hole in a conventional manner, so that the carbon fiber reinforced plastic component does not need corresponding holes. The interconnecting web may be integrally molded on the vehicle body component during its manufacture so that practically no additional engineering effort is needed.

9 Claims, 3 Drawing Sheets

(56) References Cited

U.S. PATENT DOCUMENTS

| | | | | |
|---|---|---|---|---|
| 2,598,776 | A * | 6/1952 | Flora | 24/295 |
| 2,607,971 | A | 8/1952 | Bedford, Jr. | |
| 2,799,899 | A * | 7/1957 | Chadwick | 52/511 |
| 2,963,133 | A * | 12/1960 | Maccallum | 52/466 |
| 3,473,283 | A * | 10/1969 | Meyer | 52/718.05 |
| 3,869,760 | A | 3/1975 | Meyer | |
| 4,157,674 | A | 6/1979 | Carlson et al. | |
| 4,259,767 | A | 4/1981 | Holton | |
| 4,308,307 | A * | 12/1981 | Heath et al. | 428/167 |
| 4,559,881 | A * | 12/1985 | Lankard et al. | 109/83 |
| 4,683,622 | A * | 8/1987 | Oehlke | 24/458 |
| 5,155,887 | A * | 10/1992 | Stahl | 24/297 |
| 5,217,337 | A * | 6/1993 | Junemann et al. | 411/45 |
| 5,419,606 | A * | 5/1995 | Hull et al. | 296/146.7 |
| 5,502,942 | A * | 4/1996 | Gras et al. | 52/511 |
| 5,651,632 | A * | 7/1997 | Gordon | 403/319 |
| 5,667,868 | A * | 9/1997 | Freeman | 428/120 |
| 5,746,474 | A * | 5/1998 | Bacina et al. | 296/191 |
| 5,992,914 | A | 11/1999 | Gotoh et al. | |
| 6,049,952 | A * | 4/2000 | Mihelich et al. | 24/292 |
| 6,179,366 | B1 | 1/2001 | Hansz | |
| 6,283,540 | B1 * | 9/2001 | Siebelink et al. | 296/191 |
| 6,321,495 | B1 * | 11/2001 | Oami | 52/208 |
| 6,600,652 | B2 * | 7/2003 | Chandran et al. | 361/704 |
| 6,681,543 | B2 * | 1/2004 | Nada et al. | 52/716.5 |
| 6,772,484 | B2 * | 8/2004 | Miyano et al. | 24/297 |
| 7,073,230 | B2 * | 7/2006 | Boville | 24/297 |
| 7,278,189 | B2 * | 10/2007 | Smith | 24/295 |
| 7,415,752 | B2 * | 8/2008 | De Azevedo et al. | 24/295 |
| 7,815,243 | B2 * | 10/2010 | Salzmann et al. | 296/146.7 |
| 7,828,372 | B2 * | 11/2010 | Ellison | 296/191 |
| 7,904,994 | B2 * | 3/2011 | Girodo et al. | 24/297 |
| 8,012,889 | B2 * | 9/2011 | Balthes et al. | 442/136 |
| 8,393,058 | B2 * | 3/2013 | Okada et al. | 24/297 |
| 2007/0090561 | A1 | 4/2007 | Sato et al. | |
| 2009/0174204 | A1 * | 7/2009 | Robertson | 296/1.08 |
| 2013/0106129 | A1 * | 5/2013 | Brant et al. | 296/1.08 |
| 2013/0255065 | A1 * | 10/2013 | Bachelder et al. | 29/525.01 |

FOREIGN PATENT DOCUMENTS

| | | | | |
|---|---|---|---|---|
| DE | 3734371 A1 * | 5/1989 | | B60R 13/02 |
| DE | 202 19 562 U1 | 6/2004 | | |
| DE | 103 05 015 A1 | 9/2004 | | |
| DE | 10 2006 024 604 A1 | 11/2007 | | |
| DE | 10 2008 007 879 A1 | 8/2009 | | |
| FR | 2579942 A1 * | 10/1986 | | B60R 13/02 |
| GB | 2200601 A * | 8/1988 | | B60P 7/08 |
| JP | 60-46480 U | 4/1985 | | |
| JP | 60076478 A * | 4/1985 | | B62D 25/08 |
| JP | 05310083 A * | 11/1993 | | B60R 13/02 |

OTHER PUBLICATIONS

German Search Report dated Oct. 15, 2010 with partial English translation (nine (9) pages).

* cited by examiner

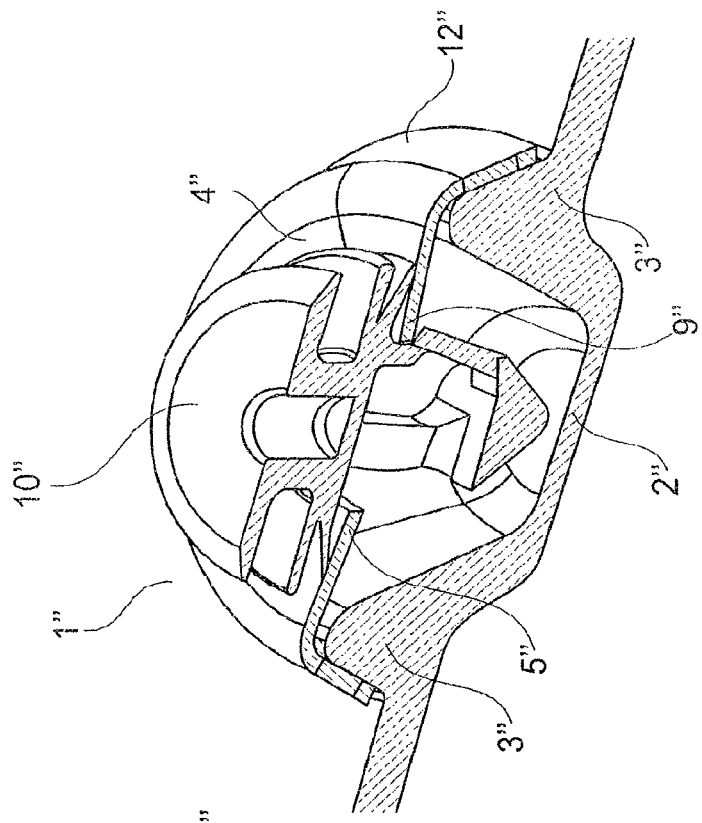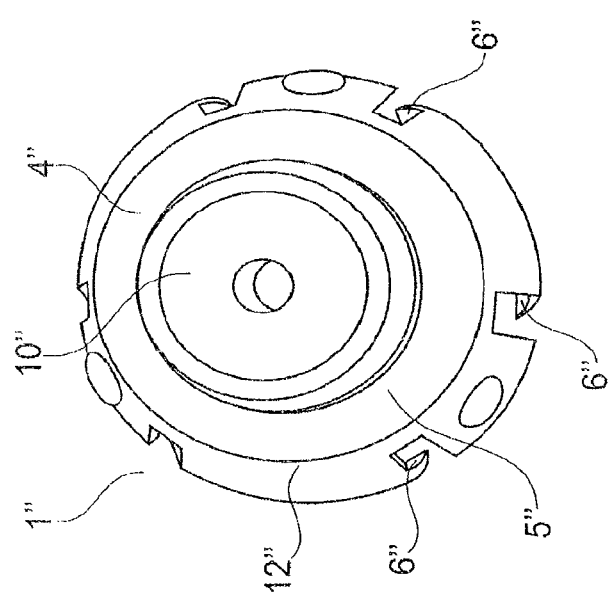

FLAT VEHICLE BODY COMPONENT MADE OF A CARBON FIBER REINFORCED PLASTIC

This application is a continuation of PCT International Application No. PCT/EP2010/066066, filed Oct. 25, 2010, which claims priority under 35 U.S.C. §119 from German Patent Application No. DE 10 2009 050 990.9, filed Oct. 28, 2009, the entire disclosures of which are herein expressly incorporated by reference.

BACKGROUND AND SUMMARY OF THE INVENTION

The invention relates to a flat vehicle body component made of a carbon fiber reinforced plastic.

In the last few decades light weight construction has played an increasingly predominant role in the manufacture of motor vehicles, because a lighter weight motor vehicle has a lower drive power requirement for the same vehicle handling properties. Furthermore, the light weight construction contributes to the reduction in fuel consumption as well as a reduction in the use of raw materials. Therefore, the current trend is to use not only light weight metals, but also synthetic plastic materials in the construction of the vehicle body. In this context, carbon fiber reinforced plastics (CFRP) exhibit the maximum stiffness based on their weight.

A carbon fiber reinforced plastic (CFRP) consists of at least one layer of carbon fibers that are embedded in a plastic matrix. The matrix usually includes a duromer, such as epoxy resin. The drawback of such components made of a carbon fiber reinforced plastic is that the material drastically limits the shape of the components. For example, a CFRP component cannot have precision bends. Moreover, it is difficult to fasten other components to a CFRP component. In the production of motor vehicles the components are often clipped, welded or screwed together. For this purpose, the vehicle body components, to which the other components are to be fastened, have to have corresponding holes. However, holes in a CFRP component cannot be simply punched out, as in the case of holes in a sheet metal component, but rather have to be milled in a time-consuming and costly manner. In so doing, the carbon fibers are separated in the region of the hole, so that the CFRP component is considerably less rigid in the region of the hole.

The object of the present invention is to provide a possibility for fastening a component to a flat CFRP component such that there is no significant decrease in the stiffness of the CFRP component in the region of the fastening of the component.

This and other objects are achieved with a flat vehicle body component that is made of a carbon fiber reinforced plastic and that consists of at least one layer of carbon fibers that are embedded in epoxy resin, wherein the flat vehicle body component has at least one interconnecting web that protrudes upwards from the flat vehicle body component and that is made entirely of epoxy resin. A mounting part at least partially envelops the interconnecting web in a force locking manner so that the mounting part is clamped securely on the interconnecting web. The mounting part has at least one hole that can be used for fastening another component.

According to the invention, a flat vehicle body component made of a carbon fiber reinforced plastic (CFRP) has at least one interconnecting web that protrudes upwards from the flat vehicle body component and that is made entirely of the matrix material epoxy resin. A mounting part at least partially envelops the interconnecting web in a force locking manner, so that the mounting part is clamped securely on the interconnecting web. The mounting part has at least one hole that can be used for fastening another component. This feature makes it possible to fasten an additional component in a hole in a conventional way, so that the vehicle body component made of a CFRP does not have to have corresponding holes. The at least one interconnecting web may be integrally molded on the vehicle body component during the manufacture of the vehicle body component, so that practically no additional engineering effort is needed for the interconnecting web. The only initial requirement is that the mounting part has to be securely clamped in the manner of an adapter on the at least one interconnecting web. Thereafter, other components can be fastened to the mounting part in a conventional and well-known manner.

The mounting part is made advantageously of a metal sheet. As a result, the components can also be fastened in at least one hole in a metal sheet, as in the case of a conventional vehicle body made of sheet steel. Hence, all tried and tested fastening elements (bolts, screws, clips, etc.) can be used without modification.

Preferably, the mounting part is designed such that it can be pushed with force from the top onto the at least one interconnecting web, in order to mount the mounting part on the flat vehicle body component. Advantageously the mounting part has at least one clamping section, which rests against the interconnecting web and which has several teeth facing the interconnecting web. In this case, the teeth are designed in such a way that their flanks make it easy to push the mounting part onto the interconnecting web, but engage with the interconnecting web when the mounting part is pulled off of the interconnecting web. The interconnecting web is made of an epoxy resin that has a low elasticity. This feature enables the teeth to bite into the interconnecting web owing to the force locking clamping.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1b is a sectional perspective view from FIG. 1a;

FIG. 2b is a sectional perspective view from FIG. 2a;

FIG. 3a is a perspective view of a vehicle body component made of a carbon fiber reinforced plastic with a third embodiment for fastening another component; and FIG. 3b is a sectional perspective view from FIG. 3a.

DETAILED DESCRIPTION OF THE DRAWINGS

Figure 1B:
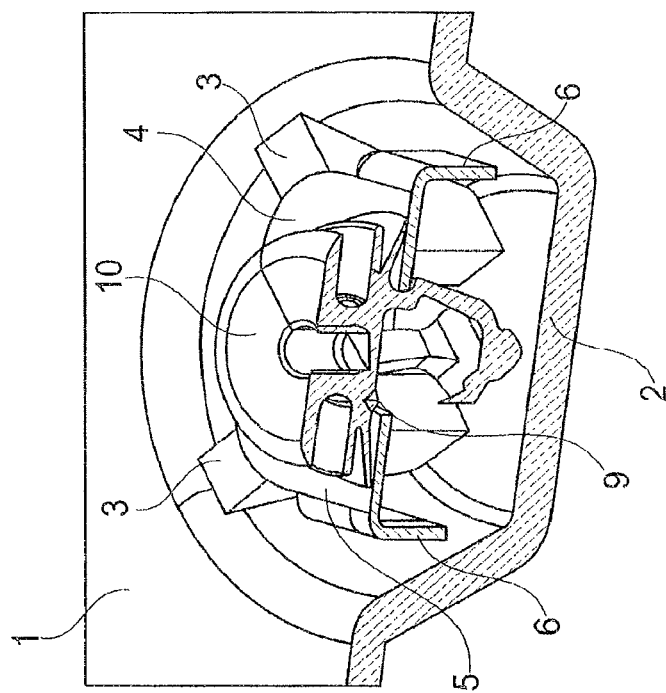
Figure 1A:
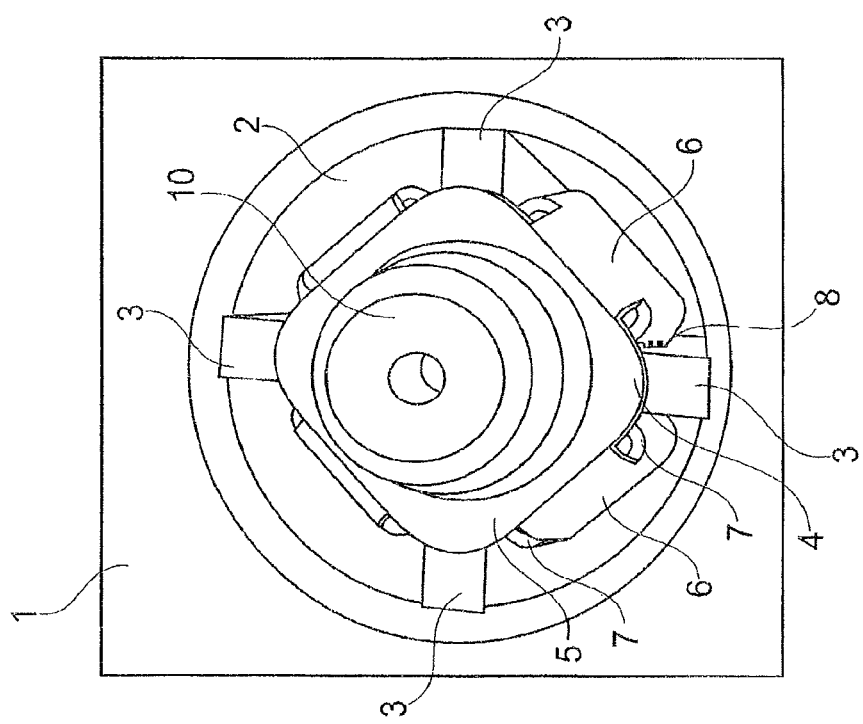
FIG. 1a is a perspective view of a vehicle body component made of a carbon fiber reinforced plastic with a first embodiment for fastening another component.

FIG. 1a and FIG. 1b show in each case a flat vehicle body component 1 that is made of a carbon fiber reinforced plastic (CFRP) and is a part of a motor vehicle body. The vehicle body component 1 has a cup-shaped depression 2. The cup-shaped depression 2 has two radial interconnecting webs 3 that intersect each other at an angle of 90°. Both interconnecting webs 3 are interrupted in the central region. The interconnecting webs 3 are made entirely of epoxy resin, which also serves as a matrix of the carbon fiber reinforced plastic, of which the flat vehicle body component 1 is made. The interconnecting webs 3 protrude upwards from the floor of the cup-shaped depression 2. The interconnecting webs 3 are molded in one piece onto the flat vehicle body component 1.

A mounting part 4, which is made of a steel sheet, is clamped in a force locking manner onto the interconnecting webs 3. The mounting part 4 has a flat section 5, which runs parallel to the vehicle body component 1. Four bent clamping sections 6 protrude downwards from the flat section 5. These clamping sections 6 project into the cup-shaped depression 2. The side edges 7 of the clamping sections 6 rest laterally against the interconnecting webs 3. Two adjacent side edges 7 of two clamping sections 6 respectively sit in a force locking manner on one interconnecting web 3. The side edges 7, which rest against the interconnecting webs 3, have in each instance a plurality of teeth 8, which are designed in the form of saw teeth. In this context the tooth flanks of the teeth 8 are arranged so as to make it easy to push the mounting part 4 onto the interconnecting webs 3 for assembly purposes, whereas the teeth bite into the interconnecting webs 3, when tension is applied to the mounting part 4, a state that would result in a disassembly. This engagement is possible because the interconnecting webs 3 that are made of epoxy resin exhibit a low elasticity, so that the teeth 8 can readily bite into the interconnecting webs 3. In addition, the clamping sections 6 are easily deformed in an elastic manner in the course of mounting the mounting part 4, so that the clamping sections rest against the interconnecting webs 3 under prestress.

The central region of the flat section 5 of the mounting part 4 has a hole 9 for the rear latching of a clip 10 that serves to fasten another component, for example, a sun visor. In this case, the clip can be any customary clip 10 that has been tried and tested for many years in the conventional manufacture of vehicle bodies. Owing to the mounting part 4, the clip connection has to satisfy the same requirements as the conventional clip connection to a vehicle body component made of sheet steel. In both cases the clip is connected to a component made of sheet steel; in the case of the invention, with the mounting part 4 made of sheet steel. Thus, there is no need to develop new clips; rather the tried and tested clips 10 can be used, as before. In addition, the flat section 5 of the mounting part 4 is located exactly at the level of the surrounding vehicle body component 1. This feature can be implemented by suitably dimensioning the depth of the cup-shaped depression and the mounting part 4.

Such a clip connection assumes that there is an adequate amount of installation space underneath the hole 9 for rear latching the section of the clip 10. For this reason the interconnecting webs 3 do not extend underneath the hole 9; and the vehicle body component 1 exhibits the cup-shaped depression 2 in the region of the clip connection, so that the lower section of the clip 10 can project into this depression 2.

Consequently, an additional component can be connected to the mounting part 4 in the tried and tested way and with it to the vehicle body component 1 made of a CFRP, so that there is no need to expend a lot of engineering effort to incorporate holes, which would significantly reduce the stiffness of the vehicle body component 1, into the vehicle body component 1 made of a CFRP. The position of the mounting part 4 on the flat vehicle body component 1 is precisely defined by the interconnecting webs 3.

Figure 2A:
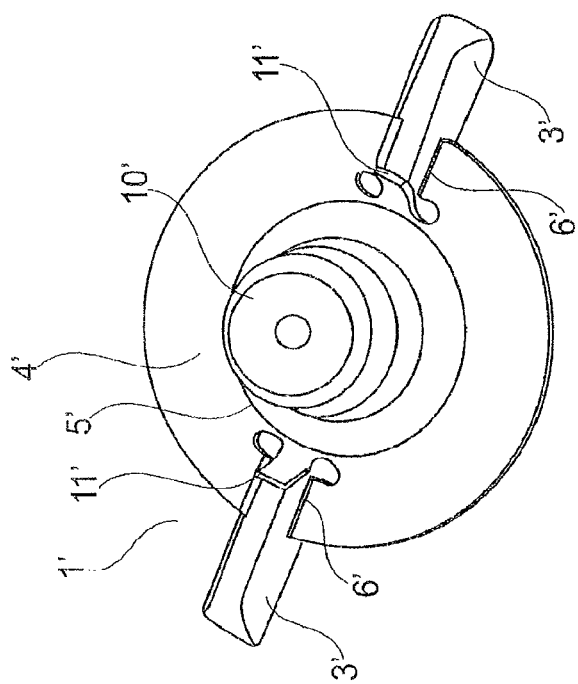
FIG. 2a is a perspective view of a vehicle body component made of a CFRP with a second embodiment for fastening another component.
Figure 2B:
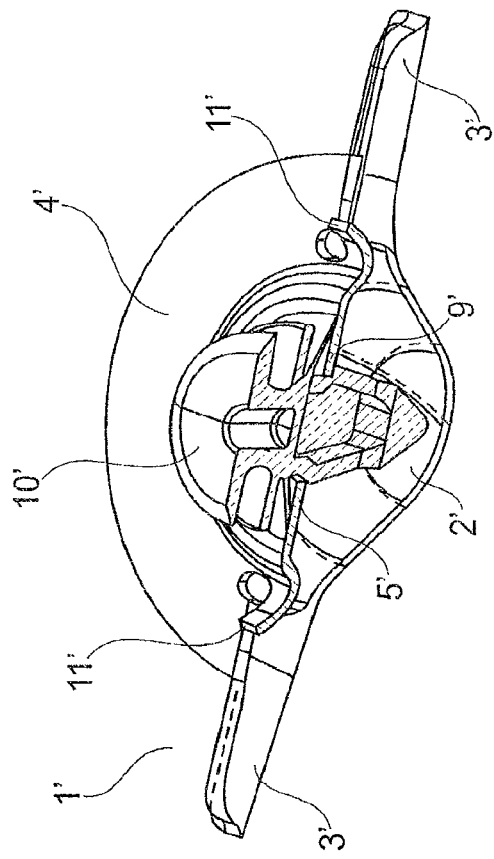

In addition to the embodiment depicted in FIG. 1a and FIG. 1b, there are also a number of other possibilities. An additional embodiment is depicted in FIG. 2a and FIG. 2b. In this case the interconnecting webs 3' are not arranged in the cup-shaped depression 2', but rather laterally thereto. The diameter of the round mounting part 4' is larger than that of the cup-shaped depression 2'. The round mounting part 4' rests flush with its surface on the vehicle body component 1' around the cup-shaped depression 2'. In the region of the two opposing interconnecting webs 3', the mounting part 4' is notched radially from the outside and angled off. These upwardly bent sections serve as the clamping sections 6', which rest against the interconnecting webs 3' in a force locking manner, and, in so doing, securely clamp the mounting part 4' to the interconnecting webs. Two additional bent sections serve as the positioning sections 11' and are supported on the face sides of the interconnecting webs 3'. These bent sections 11' define the exact position of the mounting part 4' in the longitudinal direction of both interconnecting webs 3'. In this case, too, the mounting part 4' has a flat section 5' with a hole 9' for rear latching of a clip 10' in order to fasten an additional component.

In the embodiments depicted in FIGS. 1a to 2b, straight interconnecting webs 3, 3' were always molded on the flat vehicle body component 1, 1' made of a CFRP. In the third exemplary embodiment, which is depicted in FIGS. 3a and 3b, the interconnecting web 3" is circular in shape. The interconnecting web 3" circumferentially surrounds the cup-shaped depression 2". The mounting part 4" resembles a turned over soup bowl. It has a round flat section 5" with a hole 9" as well as an edge 12", which extends downwards in the circumferential direction and which rests outwardly against the interconnecting web 3". The downward extending edge 12" has a plurality of clamping sections 6", which protrude inwards in the direction of the interconnecting web 3" and which rest against the interconnecting web 3" under prestress. A customary clip 10" latches in the hole 9". This clip can serve to fasten an additional component to the mounting part 4" and with it to the flat vehicle body component 1".

All three embodiments make it possible to mount an additional component with customary fasteners 10, 10', 10" in a hole 9, 9', 9" in a mounting part 4, 4', 4" made of sheet metal. The mounting part 4, 4', 4" securely clamps on a vehicle body component 1, 1', 1" made of a CFRP. In this way an additional component can be fastened to a vehicle body component 1, 1', 1" made of a CFRP, so that there is no need for the vehicle body component 1, 1', 1" to have a hole that would reduce the stiffness at least in the region of the hole. The only requirement is that there be at least one interconnecting web 3, 3', 3" on the vehicle body component 1, 1', 1", which can be integrally molded on the vehicle body component 1, 1', 1" made of CFRP from the matrix material during the manufacture of the vehicle body component. For this purpose the mounting part 4, 4', 4" has clamping sections 6, 6', 6", which rest against the at least one interconnecting web 3, 3', 3" under prestress, and, in so doing, securely clamp the mounting part 4, 4', 4" in a force locking manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A vehicle body component, comprising:
   a substantially flat carbon fiber reinforced plastic component comprising at least one layer of carbon fibers embedded in an epoxy resin;
   at least one interconnecting web of the flat component being made entirely of the epoxy resin, the at least interconnecting web protruding from the flat component;

a mounting part operatively configured to at least partially envelope the interconnecting web in a forced-locking manner to clamp securely the mounting part on the interconnecting web; wherein the mounting part comprises at least one hole usable for fastening of another component thereto, and there are at least two non-parallel arranged interconnecting webs.

2. The component according to claim 1, wherein the flat carbon fiber reinforced plastic component has a depression formed therein, the at least one interconnecting web being located in the depression.

3. The component according to claim 1, wherein said mounting part is clamped securely to the at least two non-parallel arranged interconnecting webs.

4. The component according to claim 2, said mounting part is clamped securely to the at least two non-parallel arranged interconnecting webs.

5. The component according to claim 1, wherein the mounting part is a sheet metal mounting part.

6. The component according to claim 5, wherein the mounting part comprises a flat section operatively configured to run parallel to the flat component in a region of the at least one interconnecting web.

7. The component according to claim 6, wherein at least two clamping sections project in a bent manner from the flat section, the at least one interconnecting web being clamped between said two clamping sections.

8. The component according to claim 1, wherein the mounting part is operatively configured to be forcedly pushed onto the at least one interconnecting web in order to mount the mounting part on the flat component.

9. The component according to claim 1, wherein the mounting part comprises at least one clamping section, said clamping section resting against the interconnecting web and having several teeth with flanks; and wherein said flanks are operatively arranged to facilitate pushing of the mounting part onto the interconnecting web while hindering a disassembly of the mounting part from the interconnecting web by engaging with the interconnecting web.

* * * * *